Patented June 15, 1943

2,321,891

UNITED STATES PATENT OFFICE 2,321,891

POLYMERIC SULPHONAMIDE

Gerard J. Berchet, Wilmington, Del., assignor to E. I. du Pont de Nemours & Company, Wilmington, Del., a corporation of Delaware No Drawing. Application October 4, 1939, Serial No. 297,964

12 Claims. (Cl. 260—556)

This invention relates to polymeric materials, and more particularly to polymeric sulphonamides.

This invention has as an object the production of new linear polymers. A further object is the manufacture of new compounds and compositions of matter comprising polymeric sulphonamides.

My new polymeric sulphonamides may be obtained by reacting an aromatic disulphonyl halide with a diamine, which may be either aliphatic or aromatic. As used herein, the term, aliphatic, will include cycloaliphatic.

The disulphonyl halide has the formula Hal $SO_2$—R—$SO_2$ Hal where R is a divalent aromatic radical, and the diamine has the formula R'HN—R"—NR'H where R' is hydrogen or a monovalent hydrocarbon radical and R" is a divalent organic radical containing a chain of at least two carbon atoms, both R and R" being free of substituents reactive with the functional groups, that is, with the sulphonyl or amino groups. A preferred class of reactants comprises those in which R is a divalent aromatic hydrocarbon radical, R' is hydrogen and R" is an aliphatic, polymethylenic radical.

In carrying out the invention the aromatic disulphonyl halide is reacted, preferably in substantially chemically equivalent amount, with a diamine in which both amino groups are hydrogen-bearing and are the sole amide-forming groups. The diamine may be either aliphatic or aromatic, and the reaction is carried out in a solvent or diluent at temperatures of 0° to 200° C., a hydrogen halide acceptor such as sodium hydroxide or excess diamine being present to remove the hydrogen halide as formed. The reaction usually is vigorous and ordinarily becomes complete in one to two hours. The polysulphonamide conveniently can be isolated by extracting the by-products, such as the hydrogen halide acceptor and its reaction product with the hydrogen halide (diamine dihydrohalide or alkali halide), from the reaction mixture with water. Another equally convenient procedure consists in isolating the alkali salt of the polysulphonamide, it being substantially insoluble in many organic solvents. This polymeric salt then is converted by subsequent acidification to the free sulphonamide.

A typical method of preparation is as follows:
One equivalent of the aromatic disulphonyl halide is added to one equivalent of the diamine (containing an additional mole of diamine as hydrogen halide acceptor) in an ether solution at such a rate that the ether gently refluxes. The resulting precipitate is washed with boiling water to remove diamine dihydrohalide, and the white solid polysulphonamide remains. An equally satisfactory alternative procedure consists in reacting equivalent amounts of the two reactants in diethyl aniline, which serves both as diluent and as hydrogen halide acceptor. In this case the excess diethyl aniline is removed and the hydrohalide salt extracted from the polysulphonamide with boiling water. Still another procedure consists in adding one equivalent of the disulphonyl halide in a dioxan solution during a period of 20–30 minutes to a well-agitated dioxan solution containing two equivalents of the diamine cooled to 0° C. Potassium hydroxide, equivalent to the disulphonyl halide reacted, is added as a dilute aqueous solution to remove the hydrogen halide formed in the reaction. Another equivalent of the disulphonyl halide in dioxan is then introduced during an interval of 20–30 minutes followed by addition of sufficient aqueous potassium hydroxide to precipitate the insoluble potassium salt of the polysulphonamide. The polysulphonamide is then obtained upon acidification of this potassium salt. The product, as isolated by one of these three alternative procedures or by other equivalent methods, may be polymerized still further by heating in a high boiling solvent such as meta-cresol at 202° C. for 5–7 hours.

An essential condition for the success of any of the above-described procedures is that neither reactant contain free acidic groups such as carboxyl or sulphonic acid groups.

The following examples, in which the parts are by weight unless otherwise indicated, are further illustrative of methods for practicing the invention. Each of these examples shows the preparation of poly-[decamethylene-meta-benzene disulphonamide].

Example I

To 300 parts of an ether solution containing 17.1 parts of decamethylenediamine is added the calculated quantity of meta-benzene disulphonyl chloride (27.4 parts). A white precipitate forms at once with evolution of heat, in accordance with the following equation:

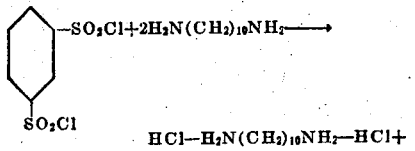

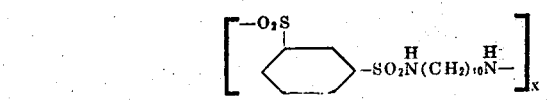

After extracting the precipitate three times with boiling water to remove the diamine dihydrochloride, there remains a white solid melting at 125–135° C. This polysulphonamide is soluble in hot 10 per cent sodium hydroxide and insoluble in hot dilute hydrochloric acid.

The polysulphonamide can be polymerized further by heating its 50 per cent solution in metacresol at 202° C. for seven hours. A grayish-yellow powder melting at 135-140° C. is precipitated upon diluting the phenol solution with ethanol. This powdery material has an intrinsic viscosity in meta-cresol of 0.33 when determined using the procedure described in U. S. 2,130,948 and Brit. Spec. 461,237.

*Example II*

Decamethylene-diamine (20 parts) is dissolved in N-diethylaniline (50 parts) and the solution is added to a mixture containing diethylaniline and meta-benzene disulphonyl chloride (25 parts). A gummy solid separates at once with evolution of heat, in accordance with the following equation:

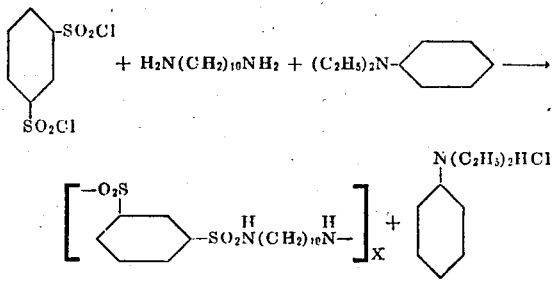

After heating the mixture to 210-225° C. for six hours, the polysulphonamide is precipitated with ethanol. This polymer is a solid melting at about 145° C. Its intrinsic viscosity in metacresol is 0.27, as determined by the procedure described in U. S. 2,130,948 or Brit. Spec. 461,237.

The polymeric sulphonamides described herein also may be defined in terms of their hydrolysis products. The hydrolysis usually is accomplished by heating a concentrated aqueous hydrochloric acid or hydrobromic acid solution containing the polysulphonamide for three to six hours at temperatures of 180-200° C. under a pressure of 700-800 lbs. gauge. Under these conditions, the polysulphonamides are hydrolyzed to the diamine dihydrohalide, an aromatic hydrocarbon, and sulphur trioxide according to the following typical equation:

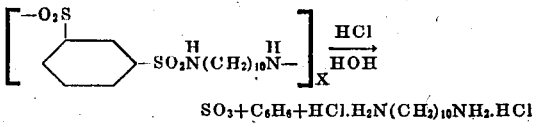

$SO_3 + C_6H_6 + HCl.H_2N(CH_2)_{10}NH_2.HCl$

Illustrations of aromatic disulphonyl halides which may replace the metabenzenedisulphonyl chloride mentioned in the foregoing examples are: parabenzenedisulphonyl chloride, 1-methyl-2,4-benzenedisulphonyl chloride, 1-nitro-2,4-benzenedisulphonyl chloride, and 2-methyl-1,3-benzenedisulphonyl chloride. In place of the chlorides, the aromatic sulphonyl fluorides or bromides also can be employed. Sulphonyl iodides, however, due to their instability and difficulty of preparation, are less suited for the synthesis of polysulphonamides.

Diamines which can be used in synthesizing polysulphonamides, and in which both amino groups are hydrogen bearing and are the sole amide-forming groups, include tetramethylenediamine, pentamethylenediamine, hexamethylenediamine, 1,6-diamino-3-hexene, decamethylenediamine, paraphenylenediamine, meta-phenylenediamine, benzidine, 1-5-diamino-3-oxapentane ($H_2NCH_2CH_2OCH_2CH_2NH_2$), 1,8 - di - amino-3,6-dioxa-octane ($H_2NCH_2CH_2OCH_2CH_2OCH_2CH_2NH_2$) beta-beta-diaminodiethyl sulphide, beta-methylhexamethylenediamine, and ortho-nitro-paraphenylenediamine. In addition to these diprimary diamines, their N,N'-dialkylated or diarylated derivatives also can be employed. Thus, the N,N'-dimethyl or N,N'-diphenyl derivatives of the above-mentioned diprimary diamines are operable. If desired, mixtures of diamines or mixtures of disulphonyl halides may be used to give interpolymers.

In effecting the condensation of any combination of the above-mentioned disulphonyl halides and diamines to obtain polysulphonamides and interpolysulphonamides, the choice of a solvent or diluent, or their simultaneous use or omission, and also the duration, temperature, and pressure conditions, as well as the choice of hydrogen halide acceptor, are factors which may be varied considerably. Thus a solvent, although not necessary, is preferable because it facilitates uniform mixing of the reactants. An appropriate organic solvent also may make possible the precipitation of the insoluble alkali salt of the polymeric sulphonamide. The solvent usually is chosen from those solvents which do not react with the starting materials. Thus, ether, toluene, xylene, nitrobenzene, ethers of ethylene glycol referred to as "Cellosolve" ethers, or tertiary amines are examples of solvents that may be employed.

Since one molecule of hydrogen halide is liberated for each sulphonamide group formed, and since the liberated hydrogen halide would immediately react with the diamine needed for further sulphonation, it is necessary to provide for a suitable hydrogen halide acceptor. Convenient acceptors include excess diamine, aqueous sodium or potassium hydroxide, and potassium or sodium carbonates. In place of excess diamine or caustic, N,N-dimethyl aniline, N,N-diethylaniline, pyridine or quinoline can be used as acceptors. In addition to functioning as hydrogen halide acceptors, this latter group of reagents also serve as diluents. When aqueous alkali is employed to accept the hydrogen halide formed in the condensation, the preferred temperature range is 0-10° C. to avoid the possibility of hydrolyzing the sulphonyl halide. It is also preferable to regulate the addition of the aqueous alkali so that it is not in excess over the hydrogen halide generated. Temperatures between 0° and 200° C. may be used when excess diamine is employed as the hydrogen halide acceptor in an inert solvent. Under these conditions, however, it is most convenient to add the disulphonyl halide to the diamine at a rate just sufficient to keep the solvent refluxing.

Since the sulphonation is vigorous, the time for complete reaction usually is only one to two hours. Secondary diamines or branched chain disulphonyl halides ordinarily react more slowly, and complete reaction in these cases may take as long as ten to twelve hours.

Usually, atmospheric pressure is employed because of convenience, although super- and subatmospheric pressure give equally good results. It is also desirable, although not essential, to carry out the reaction in an atmosphere free of acidic, basic, or other reactive gases. Thus, the reaction may be carried out in an atmosphere free of carbon dioxide, sulphur dioxide, ammonia, or oxygen. It has been found that deoxidized nitrogen is suitable for blanketing the reaction mixture.

The extent of polymerization can be controlled by employing one of the ingredients in excess, or by the use of certain monofunctional reactants which act as polymerization stabilizers. (See Brit. Pat. 495,790.) Satisfactory stabilizers include mono-primary or mono-secondary amines, such as aniline, butylamine, ethylamine, diethylamine, and N-methylaniline. Acidic stabilizers, such as p-toluenesulphonyl halides, benzenesulphonyl halides, methanesulphonyl halides, and butanesulphonyl halides also may be employed. These stabilizers usually are used in amounts varying from 0.5 to 2.0 mole per cent.

The new polymeric sulphonamides described herein are particularly useful as emulsifying agents in alkaline solution, as ingredients in molding and coating compositions and as modifying agents for sulphonamide-formaldehyde resins.

Since many apparently widely different embodiments of this invention may be made without departing from the spirit and scope thereof, it is to be understood that I do not limit myself to the specific embodiments thereof except as defined in the appended claims.

I claim:

1. A process for the production of polymeric sulphonamides which comprises reacting together an aromatic disulphonyl halide containing two and only two sulphonyl halide groups as the sole reacting groups and a diamine containing two and only two amino groups as the sole reacting groups, the two sulphonyl groups of said aromatic disulphonyl halide being separated by a chain containing at least three carbon atoms in said chain and being directly connected to carbon in the ring of said aromatic disulphonyl halide, the two amino groups of said diamine being separated by a chain containing at least two carbon atoms in said chain and being directly connected to carbon therein, and each of the amino nitrogen atoms of said diamine being hydrogen-bearing and attached only to hydrogen and carbon atoms.

2. A polymeric sulphonamide free from carboxylic amide groups and having the recurring structural unit:

—O₂S—R—SO₂—NR'—R''—NR'— wherein R is a divalent aromatic radical separating the two SO₂ groups by a chain containing at least three carbon atoms in said chain, each of said two SO₂ groups being directly connected to carbon in the ring of said aromatic radical, R' is a member of the group consisting of hydrogen and monovalent hydrocarbon radicals, and R'' is a divalent organic radical separating the amino groups by a chain containing at least two carbon atoms in said chain, each of said two amino groups being directly connected to carbon in said chain, R being connected to two and only two SO₂ groups and R'' being connected to two and only two amino groups as the sole groups reactive with sulphonyl halide and amino groups.

3. A polymeric sulphonamide free from carboxylic amide groups and having the recurring structural unit:

wherein R is a divalent aromatic hydrocarbon radical separating the two SO₂ groups by a chain containing at least three carbon atoms in said chain, each of said two SO₂ groups being directly connected to carbon in the ring of said aromatic hydrocarbon radical, R' is hydrogen, and R'' is a divalent polymethylenic hydrocarbon radical separating the amino groups by a chain containing at least two carbon atoms.

4. The process set forth in claim 8 in which the disulphonyl halide is meta-benzenedisulphonyl chloride and the diamine is decamethylenediamine.

5. A polymeric sulphonamide consisting of the recurring structural unit:

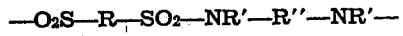

wherein R is an arylene radical having at least three carbon atoms between the sulphonyl groups, R'' is a hydrocarbon radical having a chain length of at least two carbon atoms, and R' is a member of the group consisting of hydrogen and monovalent hydrocarbon radicals.

6. A process for the production of polymeric sulphonamides consisting of the recurring structural unit:

which comprises reacting together, in the presence of a hydrogen halide acceptor, an arylene disulphonyl halide of the formula

with a diamine of the formula

wherein X is a halogen, R is an arylene radical having at least three carbon atoms between the sulphonyl groups, R'' is a hydrocarbon radical having a chain length of at least two carbon atoms, and R' is a member of the group consisting of hydrogen and monovalent hydrocarbon radicals.

7. A polymeric sulphonamide consisting of the recurring structural unit:

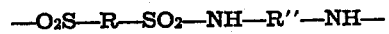

wherein R is an arylene radical and R'' is a member of the group consisting of arylene radicals, and alkylene radicals containing at least four carbon atoms.

8. A process for the production of polymeric sulphonamides consisting of the recurring structural unit:

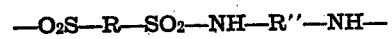

which comprises reacting together, in the presence of a hydrogen halide acceptor, an arylene disulphonyl halide of the formula

with a diamine of the formula H₂N—R''—NH₂; wherein X is a halogen, R is an arylene radical and R'' is a member of the group consisting of arylene radicals, and alkylene radicals containing at least four carbon atoms.

9. The polymeric sulphonamide set forth in claim 2 wherein R'' is a divalent aliphatic hydrocarbon radical.

10. The process which comprises reacting together in the presence of a hydrogen halide acceptor, the aromatic disulphonyl halide and diamine set forth in claim 1.

11. The process which comprises reacting together in the presence of a hydrogen halide acceptor, the aromatic disulphonyl halide and diamine set forth in claim 1, where the disulphonyl halide is a disulphonyl chloride.

12. Poly-[decamethylene-meta benzene disulphonamide].

GERARD J. BERCHET.